United States Patent [19]

Savicki

[11] Patent Number: 5,791,289
[45] Date of Patent: Aug. 11, 1998

[54] DISPOSABLE PET LITTER BASIN

[76] Inventor: Alan F. Savicki, 67 Bourbon St., South Windsor, Conn. 06074

[21] Appl. No.: 711,570

[22] Filed: Sep. 10, 1996

[51] Int. Cl.⁶ .................................................. A01K 29/00
[52] U.S. Cl. ................................................................ 119/165
[58] Field of Search ........................... 119/165, 61, 167, 119/169, 170

[56] References Cited

U.S. PATENT DOCUMENTS

| | | |
|---|---|---|
| 3,664,304 | 5/1972 | Carter ........................................ 119/61 |
| 4,716,853 | 1/1988 | d'Aniello ................................. 119/165 |
| 4,779,566 | 10/1988 | Morris et al. ........................... 119/165 |
| 4,838,202 | 6/1989 | Neu .......................................... 119/165 |
| 4,886,012 | 12/1989 | Atchley .................................... 119/61 |

*Primary Examiner*—Thomas Price
*Attorney, Agent, or Firm*—Gary L. Warner

[57] ABSTRACT

A disposable pet litter basin is disclosed. The basin includes a bottom and a first sidewall which forms the container for animal litter and a second sidewall spaced apart from the first sidewall by a plateau and trough. The plateau and trough increase the basin's ability to resist spillage of litter by providing increased strength and stability and by providing an area to receive spillage from the container for animal litter which is inside the litter basin. Further, the basin has an anti-tipping feature to stabilize the basin during use.

10 Claims, 5 Drawing Sheets

DISPOSABLE PET LITTER BASIN

BACKGROUND OF THE INVENTION

1. Field of the Invention

This invention relates to a pet litter basin for small domestic animals, particularly house cats, which can be transported, used and disposed of conveniently.

2. Description of the Prior Art

For various domestic animals, particularly house cats, it is common to provide a box in which animal litter is maintained so that the animal may relieve itself in a sanitary manner. Such boxes usually take the form of open containers or basins into which animal litter in the form of particles of absorbing material, is placed. Periodically, the soiled litter in the box must be replaced with clean litter. Cleaning is typically accomplished by removing the soiled litter with a scoop or other implement, and adding new litter to the unsoiled litter remaining in the box.

Cleaning the litter box is considered by most people to be an unpleasant chore. Moreover, in some instances, such as when traveling with an animal, it is difficult and unpractical to regularly clean the litter box. One way to avoid the unpleasantness and/or unpracticability of cleaning a litter box is to simply dispose of it in its entirety after it has become sufficiently soiled and replace it with an entirely new litter box with fresh litter in it.

On such disposable litter box is disclosed in U.S. Pat. No. 4,716,853. The litter box described in that patent is a generally rectangular, open-top shallow container formed by a flat bottom which is surrounded by lateral walls. The lateral walls include a rabbet which defines an annular shoulder extending from the walls around the periphery of the bottom. Animal litter is placed in the container up to the height of the shoulder which extends inwardly from the walls. A membrane of paper or plastic material is placed over the litter and secured directly on the upper surface of the shoulder. When this material is removed, the litter is exposed for use. Once the litter material is soiled, the litter box may be discarded.

While the product described in U.S. Pat. No. 4,716,853 does provide a disposable litter box for domestic animals, it includes several disadvantageous features attendant its design. For example, because the litter box is made of a low cost, semi-rigid plastic material or cardboard, it lacks the strength of standard litter boxes. This lack of strength can result in deformation of the lateral walls by the animal using the box and litter material being spilled out of the box. Thus, there exists a need for a litter box which is advantageously disposable, while at the same time resists spillage of the litter material during use.

SUMMARY OF THE INVENTION

It is, therefore, an object of this invention to provide a litter basin which can be easily transported, used and disposed of and which resists spillage of litter material when used by an animal.

Other objects and advantages of the invention will become apparent to those of skill in the art upon reading the entire disclosure provided herein.

These objects and advantages are achieved in accordance with the invention by a disposable pet litter basin which comprises a generally flat bottom having a periphery, a first sidewall extending upwardly from this periphery to a plateau which extends outwardly from the first sidewall. The bottom and first sidewall define a container for animal litter. A trough extends outwardly and downwardly from the plateau, terminating at the bottom of a second sidewall which extends upwardly from the trough. The first and second sidewalls are, thus, spaced apart from one another by the plateau and trough which provides added strength and stability to the basin as well as a region within the basin which can receive litter which spills from the litter container defined by the bottom and first sidewall of the basin. Further, the trough prevents accidental tipping of the litter container by providing a flexure point between the first and second sidewalls whereby the second sidewall can flex downwardly to contact the floor and prevent tipping of the litter container during use.

BRIEF DESCRIPTION OF THE FIGURES OF DRAWING

DETAILED DESCRIPTION OF THE PREFERRED EMBODIMENT

Figure 1:
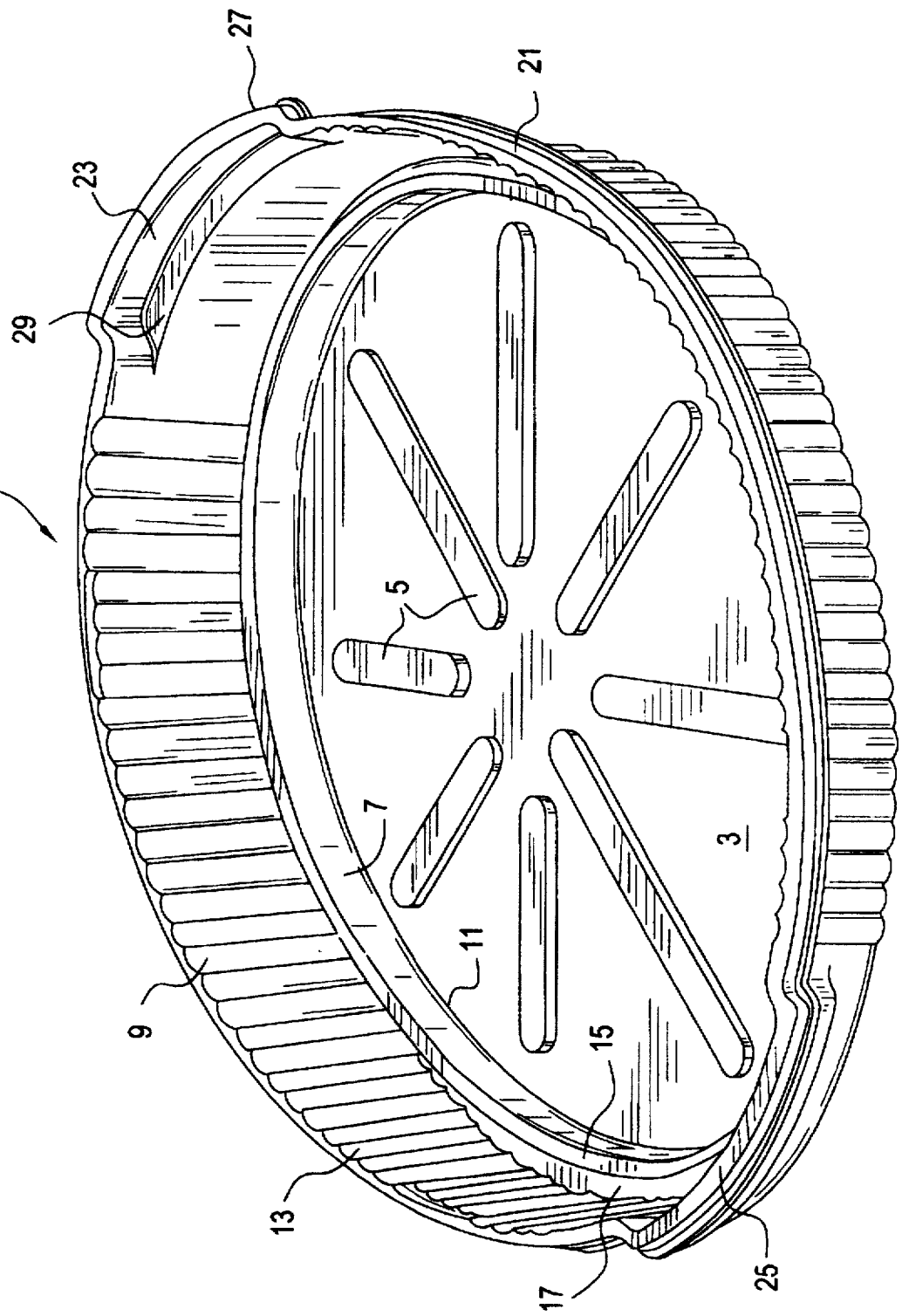
FIG. 1 is a perspective view of a disposable litter basin according to a preferred embodiment of the invention.
Figure 2:
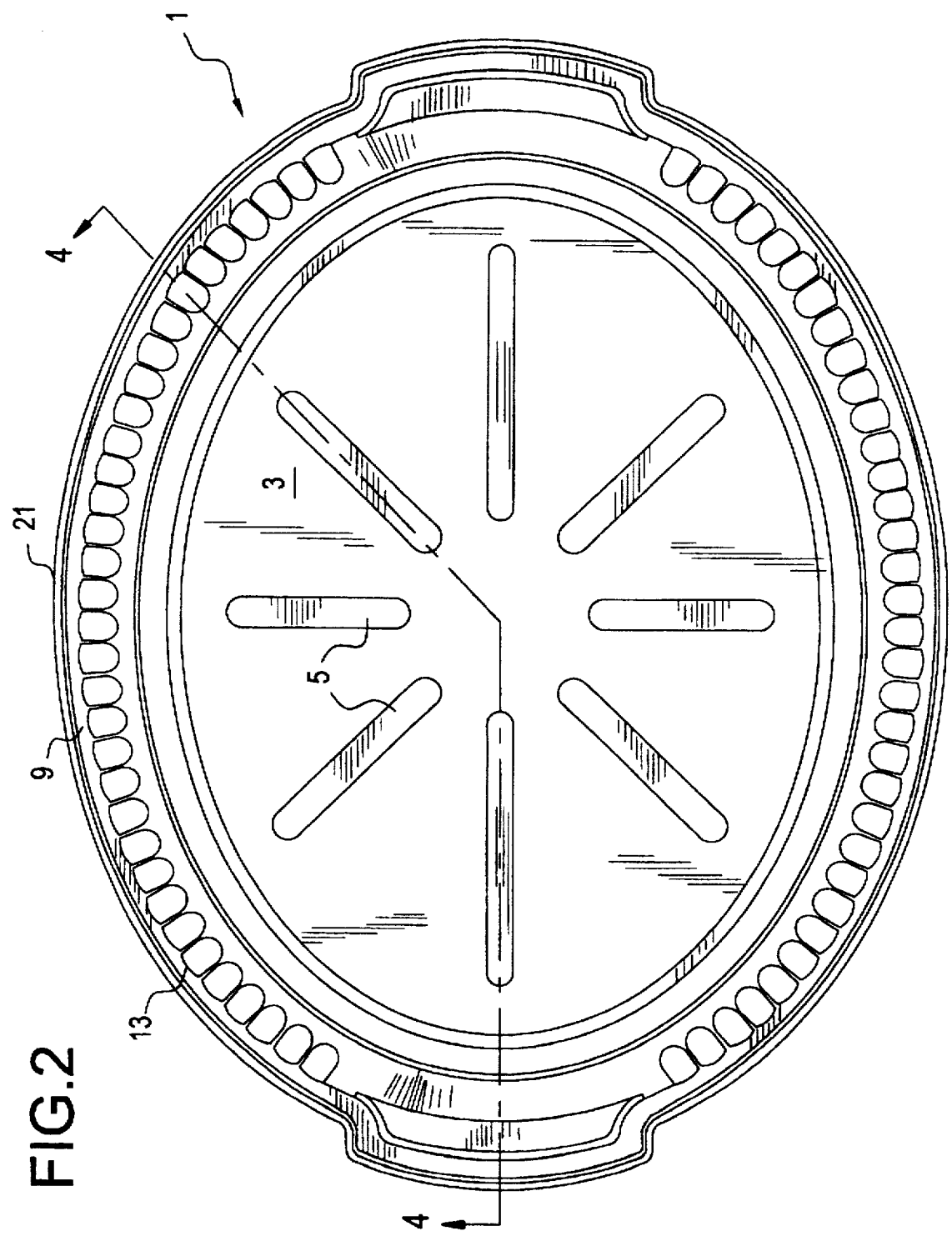
FIG. 2 is a top plan view of the litter basin of FIG. 1.
Figure 3:
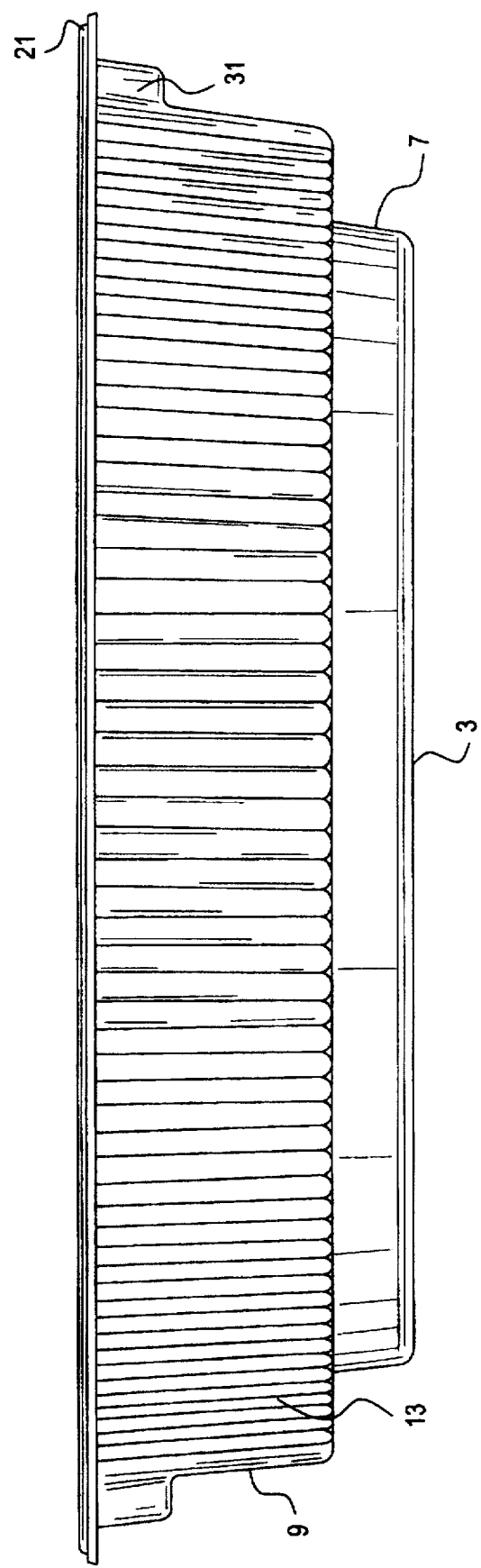
FIG. 3 is a side view of the litter basin of FIG. 1.

Referring to FIGS. 1–4, litter basin 1 is seen to be formed with a generally flat bottom 3, which preferably includes reinforcing means in the form of molded ribs 5, and first and second sidewalls 7 and 9, respectively. First sidewall 7, extends upwardly from the periphery of the bottom 11 and is disposed inside second sidewall 9. Second sidewall 9 preferably includes reinforcing means in the form of molded ribs 13. Litter basin 1 is preferably made from low cost, semi-rigid plastic such as high density polyethylene or polystyrene by thermoforming.

First sidewall 7 extends upwardly from bottom 3 to plateau 15. First sidewall 7 and bottom 3 form an inner container for the animal litter in the basin. The height of the first sidewall is selected to provide the desired volume of animal litter in the basin. Typically from about three to four pounds of animal litter is desirable, requiring the height of the first sidewall to be about one to two inches.

Figure 4:
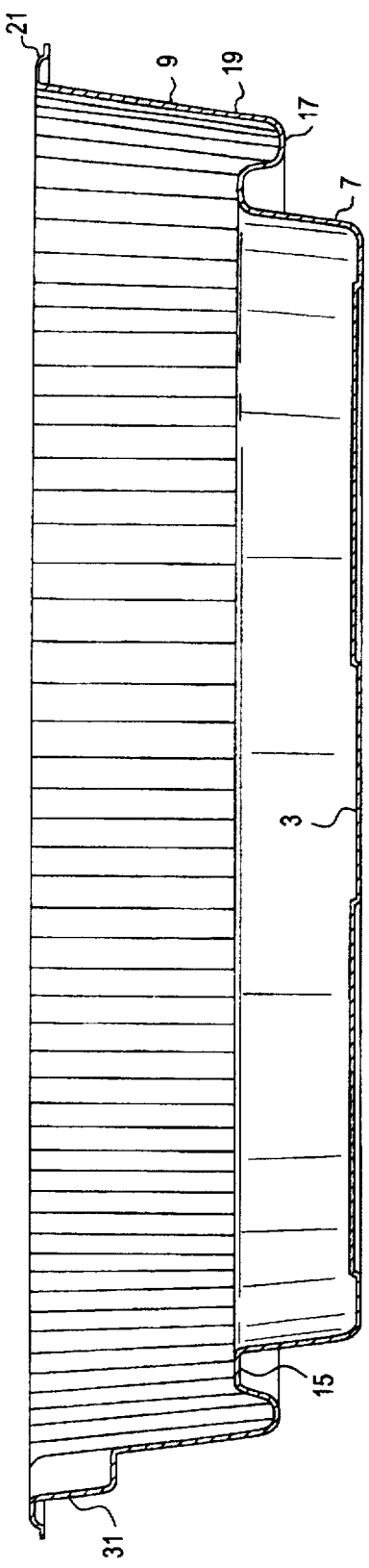
FIG. 4 is a cross-sectional view taken along line 4—4 in FIG. 2.

First sidewall 7 and plateau 15 are spaced apart, inwardly from second sidewall 9 by trough 17. As best shown in FIG. 4, trough 17, which is substantially U-shaped in cross-section, extends outwardly and downwardly from plateau 15 and then upwardly where it joins the bottom of second sidewall 9 shown in FIG. 4 at 19. The position of trough 17, between second sidewall 9 and plateau 15, increases the ability of the litter basin to resist spillage of the animal litter contained within the inner container defined by bottom 3 and first sidewall 7, by providing added strength and stability to the first and second sidewalls and by providing a region inside the litter basin, which can receive litter which spills over first sidewall 7.

Also as shown in FIG. 4, while first sidewall 7 extends upwardly from the flat bottom 3, second sidewall 9 is disposed above bottom 3 a distance which is essentially the height of the first sidewall, with plateau 15 and trough 17 therebetween. This design, in conjunction with the flexible material of construction cause the trough to function as a flexing stabilization juncture in those instances when an animal (such as a cat) steps on second sidewall 9 as it enters or exits the basis. As an animal steps on second sidewall 9 trough 17 can bend outwardly and downwardly until some portion of second sidewall 9 contacts the surface upon which the basin rests without causing the entire litter basin to tip over. The relative sizing of first sidewall 7, trough 17 and second sidewall 9 may be selected to optimize this integrated interaction to provide this basin tipping prevention mechanism.

The top of second sidewall 9 is provided with an out turned edge 21 around its periphery and two handles 23, 25 positioned opposite one another. Each handle 23, 25 is formed by creating an offset section 27 of edge 21 and a handle plateau 29. A handle wall 31 is provided to interconnect offset section 27 with second sidewall 9. This creates a gripping means which enables basin 1 to be handled from a position spaced a considerable distance from bottom 3 and any waste that may be present within the basin. Other types of gripping means including apertures in second sidewall 9 can be used.

Figure 5:
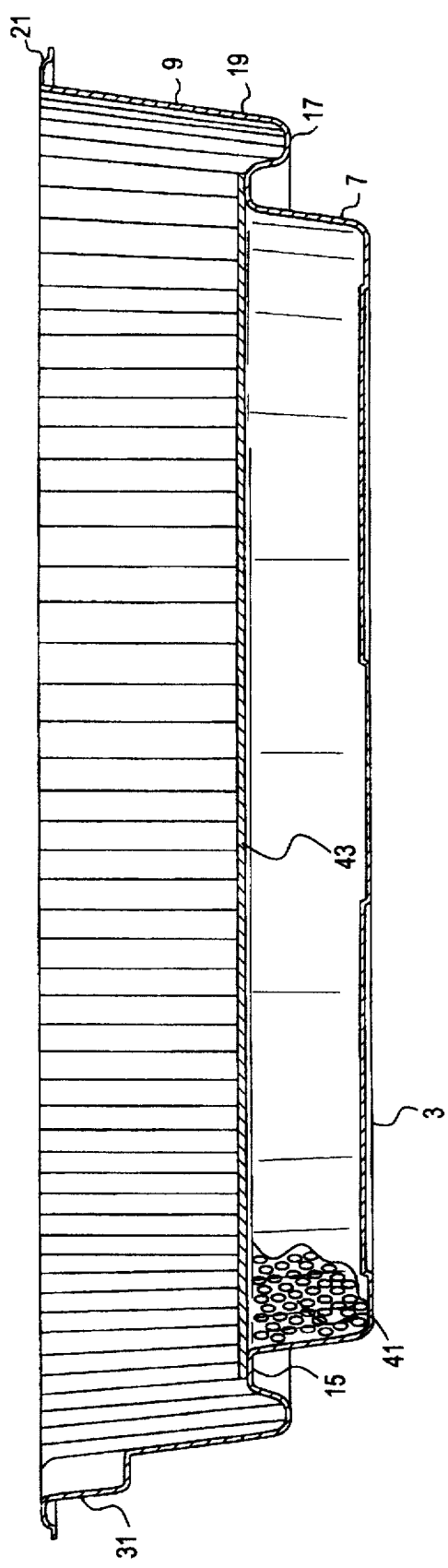
FIG. 5 is a cross-sectional view of the litter basin taken along the same line as in FIG. 4 with cover and animal litter added.

Referring to FIG. 5, animal litter 41 is placed in the basin in the container formed by bottom 3 and first sidewall 7. Cover 43 is placed over the container to maintain the litter material in place in the container when the litter basin is not in use. Cover 43 is fixedly attached by, for example, adhesive, to the upper surface of the plateau 15 before the litter basin is put in use. Typically, cover 43 is made of paper or plastic film. To use the litter basin, cover 43 is removed by pulling or tearing it from the upper surface of the plateau to expose the animal litter underneath. If desired, cover 43 can be made and attached to plateau 15 in such a manner that it can be removed without being destroyed so that it can be re-applied to cover the litter after use. In this case, cover 43 should be made of a more rigid material than paper or plastic film, such as poster board or card board. Cover 43 can also serve as the label for the litter basin by including printed material on its outer surface which is visible when the basin is viewed from above.

Figure 6:
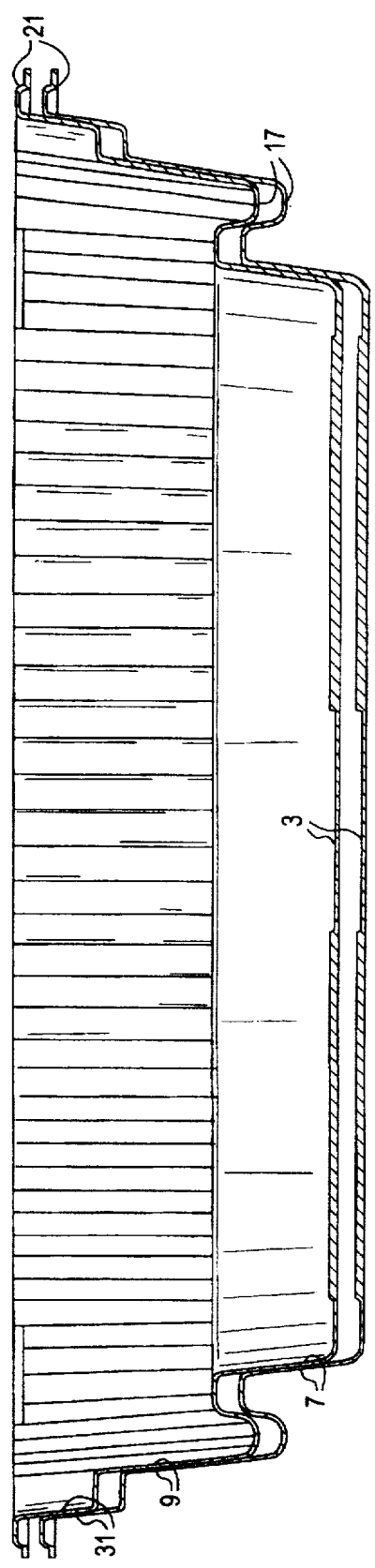
FIG. 6 is a cross-sectional view of two stacked litter basins taken along the same line as in FIG. 4.

As shown in FIG. 6, empty litter basins of the invention can be readily stacked together with the first sidewall and trough of the inner basin nesting within the first sidewall and trough of the outer basin. To facilitate stacking, first and second sidewalls are preferably given a slight outer flare as they extend upward. Stacking in this manner greatly improves storage and handling of the empty basins. The slight outer flare also facilitates the basin tipping prevention mechanism.

Although described with respect to preferred embodiments of the invention, it should be readily understood that various changes and/or modifications may be made without departing from the spirit of the invention. In general, the invention is only intended to be limited by the scope of the following claims.

I claim:

1. A disposable pet litter basin comprising:
   a unitary structure formed of a flexible material having a first sidewall and a second sidewall;
   a generally flat bottom having a periphery;
   a first sidewall extending upwardly from the bottom and inwardly spaced from said second sidewall and defining
   a plateau extending outwardly from the first sidewall and defining within its periphery a downwardly projecting recess to define a container for animal litter,
   a trough extending outwardly and downwardly from said plateau;
   said second sidewall extending upwardly from the trough, wherein said first sidewall and said second sidewall are spaced apart from one another by said plateau and trough, and
   a container for animal litter extending downward of said trough.

2. The litter basin according to claim 1, further comprising animal litter disposed in the container for litter defined by the bottom and first sidewall.

3. The litter basin according to claim 2, further comprising a generally flat cover positioned over the animal litter and fixedly attached to the basin along the upper surface of the plateau.

4. The litter basin according to claim 3, wherein said cover comprises a label which is fixedly attached to said upper surface of the plateau by adhesive.

5. The litter basin according to claim 1, further comprising reinforcing means in said bottom.

6. The litter basin according to claim 1, further comprising reinforcing means in said second sidewall.

7. The litter basin according to claim 1, wherein said basin is made of thermoformed plastic.

8. The litter basin according to claim 7, further comprising molded reinforcing ribs in said bottom and said second sidewall.

9. The litter basin according to claim 1, wherein said second sidewall is disposed above said bottom such that said trough forms a flexing juncture which allows the second sidewall to be displaced outwardly and downwardly without causing the litter basin to tip over.

10. A disposable pet litter basin comprising:
   a unitary structure formed of a flexible material having a first sidewall and a second sidewall;
   a generally flat bottom having a periphery;
   a first sidewall extending upwardly from the bottom, inwardly spaced from said second sidewall, said first sidewall and said bottom comprising a container containing animal letter therein;
   a plateau extending outwardly from the first sidewall, said plateau having a substantially flat upper surface;
   a generally flat cover positioned over the animal litter and fixedly attached to the upper surface of said plateau;
   a trough extending outwardly and downwardly from said plateau; and
   a second sidewall extending upwardly from the trough, wherein said first sidewall and said second sidewall are spaced apart from one another by said plateau and trough and said second sidewall is above said bottom such that said trough forms a flexing juncture whereby said second sidewall can be displaced outwardly and downwardly without causing the litter basin to tip over.

* * * * *